May 19, 1925.

J. W. STANLEY

TOOL HOLDER

Filed Feb. 26, 1923

1,538,670

Witnesses:
Edwin Trueb

Inventor:
JOSEPH W. STANLEY,
by D. Anthony Usina
his Attorney.

Patented May 19, 1925.

1,538,670

UNITED STATES PATENT OFFICE.

JOSEPH W. STANLEY, OF JOHNSTOWN, PENNSYLVANIA.

TOOL HOLDER.

Application filed February 26, 1923. Serial No. 621,348.

*To all whom it may concern:*

Be it known that I, JOSEPH W. STANLEY, a citizen of the United States, and resident of Johnstown, in the county of Cambria and State of Pennsylvania, have invented certain new and useful Improvements in Tool Holders, of which the following is a specification.

This invention relates to tool holders and more particularly to tap holders for use with nut tapping machines and the like, and has for its principal object the provision of a holder of this class that will permit the tool to be automatically released by an accumulation of nuts upon the tool.

Another object is the provision of a holder in which the tool is held by a spring pressed member which automatically engages the tool when it is inserted therein.

A still further object is the provision of a tool holder having the novel combination, design, and construction of parts described in the following specification and illustrated in the accompanying drawings.

In the drawings—

Figure 1:
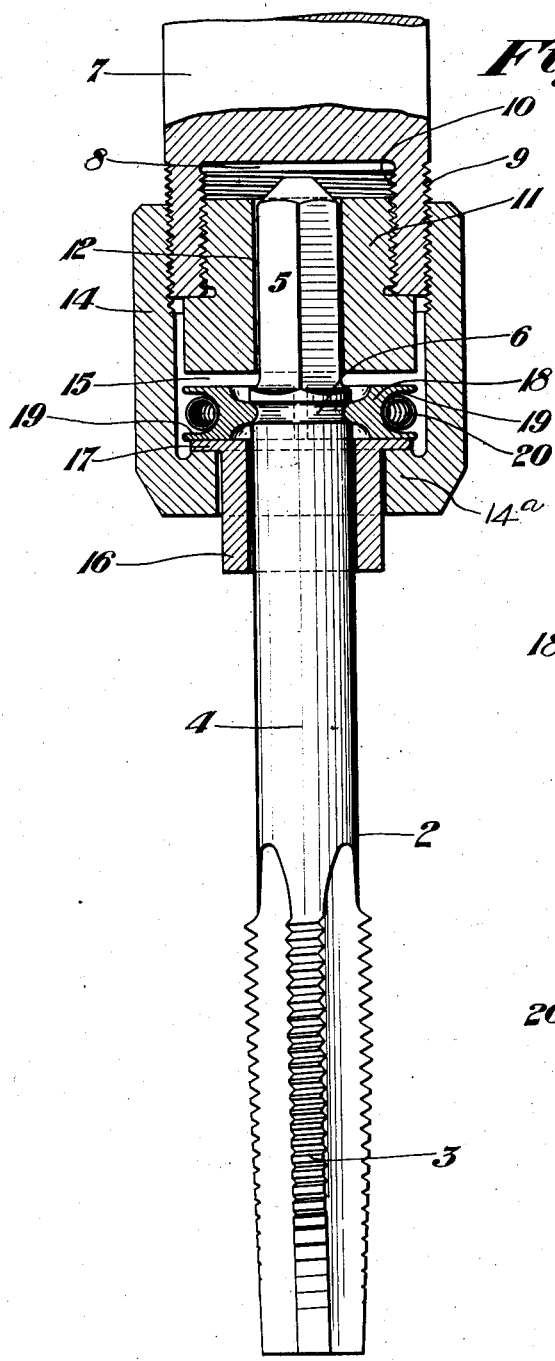
Figure 1 is a side elevation, partly in section, of a tool holder constructed in accordance with my invention and having a tapping tool therein.
Figure 2:
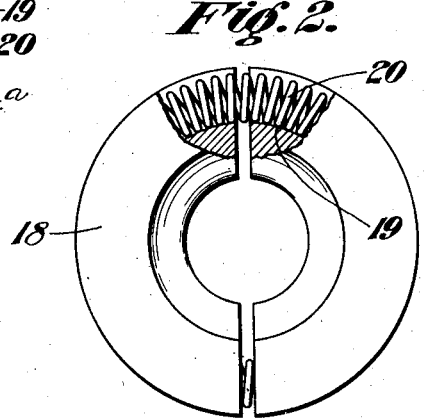
Figure 2 is a plan of the split holding washer member.
Figure 3:
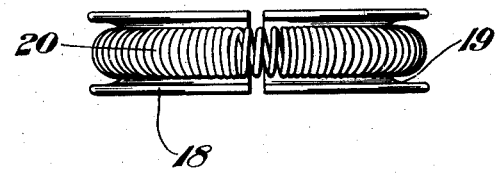
Figure 3 is a side elevation of the split holding washer and spring.

Referring more particularly to the drawings, the numeral 2 designates the tapping tool as a whole which has the usual tapping head 3, cylindrical shank portion 4, which is of less diameter than the tapping head, and a squared upper end 5 adapted to fit within the squared socket of the holder. An annular groove 6 is formed in the shank 4 just below the squared portion 5 for a purpose to be described.

The tool holder may be formed as a part of the spindle of the machine or may be separate therefrom, as desired, and comprises a hollow body portion into which the shank 4 of the tool projects. In the present embodiment of my invention I have shown the tool holder formed as part of the machine spindle.

The body portion of the tool holder, as shown, is formed on the lower end of the spindle 7 of a tapping machine, which is provided with a recess 8 and has external and internal threads 9 and 10, respectively, on the wall surrounding said recess. A socket member 11 having a squared recess or socket 12 for the reception of the squared upper end 5 of the tool, is screwed into the recess 8. A sleeve 14 having an inwardly projecting bottom flange 14ª is screw threaded upon the externally threaded surface 9 of the spindle 7 so as to form a space or chamber 15 between the lower face of the socket member 11 and the flange 14ª of sleeve 14, which space or chamber forms an enlarged continuation of the socket or recess 12, for the reception of tool locking means. It will be expressly understood that, as stated above, the tool holder may be made as a part of the spindle 7 or as a separate article and also that its body portion consisting of the recessed lower end of the spindle 7, socket member 11 and sleeve member 14 may be made of different and fewer or more parts, as desired, as long as it is provided with a tool receiving socket and a space or chamber for the tool locking means.

The locking means comprises a split washer 18, having its inner periphery tapered or rounded convexly to fit snugly within the groove 6 and its outer periphery provided with a concave groove 19 for the reception of a coiled spring 20. The washer 18 is mounted in the space 15 and is adapted to engage the tool when it is inserted in the holder.

A loose vertically movable bushing member or plunger 16 having an annular flat flange 17 on its upper end is mounted within the sleeve 14, so that the flange 17 underlies the washer 18 and overlies the flange 14ª of the sleeve 14, while its body portion projects downwardly through the sleeve 14 into the path of the nuts accumulated on the shank 4 of the tool.

When the tool is forced into the holder the washer 18 will be forced open against the tension of spring 20 and the tool will be moved upwardly until the washer 18 snaps into the groove 6 in the shank 4 of the tool. In this position the tool is ready for the tapping operation and as the tool is forced through each nut, the nut will move onto the shank 4 until a sufficient number of nuts have accumulated upon the shank to fill it. When the shank 4 becomes filled with accumulated nuts the uppermost nut will normally be in engagement with the lower face of the bushing 16. The next nut to be threaded will then move the accumulated nuts upwardly and the top nut will be forced against the bushing or plunger 16, moving it upwardly, so as to raise the washer 18 in the recess 15 and at the same time the tool will be forced downwardly, and the relative movement thus caused between the washer 16 and tool will automatically release the washer from the groove 6 and permit the tool and its accumulation of tapped nuts to be discharged from the holder.

In case the nuts being threaded have a larger inside diameter than the bushing 16, so that they will not engage said bushing, the tool will be automatically disengaged from the holder by the uppermost nut engaging the bottom face of the flange 14ª of the sleeve 14, which forms a part of the body of the holder when the shank 4 of the tool has been completely filled with accumulated nuts. The next nut to be threaded will then be forced against the accumulated nuts, which will act as a yoke to cause a downward movement of the tool as the last nut is moved along the threaded portion of the tool, thus the tool will be pulled through the expansible washer 18 and automatically released. The tool may also be released in the last described manner from a holder constructed in accordance with my invention, from which the bushing or plunger 16 has been omitted. It will be understood, of course that the preferred construction of my invention includes the bushing or plunger 16, but that the holder may be made without the bushing and remain operative.

I claim:—

1. The combination with a nut tapping tool having a tapping head on its lower end, a squared upper end adapted to be gripped in a holder, and a cylindrical shank portion of less diameter than said tapping head, said shank portion being provided with an annular concave groove adjacent its upper end, of a holder adapted to receive the squared upper end of said tool and comprising a body portion, a split washer mounted in said body portion and provided with a rounded or convex inner wall adapted to be engaged in the groove in said shank to prevent accidental displacement of the tool, and means for resiliently holding said washer in engagement with said tool, said tool being releasable by relative longitudinal movement between said tool and said washer.

2. The combination with a nut tapping tool having a tapping head on its lower end, a squared upper end adapted to be gripped in a holder, and a cylindrical shank portion of less diameter than said tapping head, said shank portion being provided with an annular groove adjacent its upper end, of a holder adapted to receive the squared upper end of said tool and comprising a body portion, a split washer mounted in said body portion and adapted to be engaged in the groove in said tool shank to prevent accidental displacement of the tool and means for resiliently holding said washer in engagement with said tool, said tool being releasable by relative longitudinal movement between said tool and said washer.

3. The combination with a nut tapping tool having a tapping head on its lower end, a squared upper end adapted to be gripped in a holder, and a cylindrical shank portion of less diameter than said tapping head, said shank portion being provided with an annular concave groove adjacent its upper end, of a holder adapted to receive the squared upper end of said tool and comprising a body portion, a split washer mounted in said body portion and provided with a rounded or convex inner wall adapted to be engaged in the groove in said shank to prevent accidental displacement of the tool, and an endless coiled spring mounted around the periphery of said washer for resiliently holding said washer in engagement with said tool, said tool being releasable by relative longitudinal movement between said tool and said washer.

4. The combination with a nut tapping tool having a tapping head on its lower end, a squared upper end adapted to be gripped in a holder, and a cylindrical shank portion of less diameter than said tapping head, said shank portion being provided with an annular concave groove adjacent its upper end, of a holder adapted to receive the squared upper end of said tool and comprising a body portion, a split washer mounted in said body portion and provided with a rounded or convex inner wall adapted to be engaged in the groove in said shank to prevent accidental displacement of the tool, means for resiliently holding said washer in engagement with said tool, and means adapted to be actuated by an accumulation of nuts on the shank of said tool for causing a relative longitudinal movement between said tool and said washer whereby said tool will be automatically released.

5. A tool holder, comprising a body having a socket to receive a tool shank, said socket having an enlargement, tool securing means within the socket enlargement for preventing endwise displacement of a tool shank from the other, and tool releasing means within the socket and associated with said tool securing means and projecting through the socket entrance into co-operative relation with the work for actuation thereby to release the tool securing means.

6. A tool holder, comprising a body having a tool receiving socket, tool securing means within the socket for preventing endwise displacement of a tool from the holder and tool releasing means within the socket in co-operative relation with the tool securing means for releasing the latter, said tool releasing means having a plunger portion projecting outwardly through the entrance to the socket and adapted for engagement with the work to actuate the tool securing means to release the tool.

7. A tool holder, comprising a body having a chamber provided at one end with an entrance opening to receive the shank of a tool, said chamber being provided at its opposite end with a socket to receive one end of a tool shank, a spring pressed split washer within the chamber and adapted to engage a tool shank to prevent endwise displacement thereof, and a plunger projecting outwardly through the entrance opening and bearing at one end against the washer and having its opposite end adapted for engagement with the work for separating the split washer to release the tool shank.

8. A tool holder, comprising a body having a chamber provided with an entrance opening to receive the shank of the tool, a spring pressed split washer within the chamber and for engagement with the tool shank to prevent endwise displacement thereof, and means operated by contact with the work for separating the split washer to release the tool shank.

In testimony whereof I have hereunto set my hand.

JOSEPH W. STANLEY.